US007836460B2

(12) United States Patent
Kussmaul et al.

(10) Patent No.: US 7,836,460 B2
(45) Date of Patent: Nov. 16, 2010

(54) SERVICE BROKER REALIZING STRUCTURING OF PORTLET SERVICES

(75) Inventors: Timo Kussmaul, Boeblingen (DE); Andreas Arning, Tuebingen (DE)

(73) Assignee: International Business Machines Corporation, Armonk, NY (US)

( * ) Notice: Subject to any disclaimer, the term of this patent is extended or adjusted under 35 U.S.C. 154(b) by 1011 days.

(21) Appl. No.: 11/531,233

(22) Filed: Sep. 12, 2006

(65) Prior Publication Data
US 2007/0136236 A1    Jun. 14, 2007

(30) Foreign Application Priority Data
Dec. 12, 2005    (EP) .................................. 05111944

(51) Int. Cl.
G06F 3/00    (2006.01)
G06F 9/44    (2006.01)
G06F 9/46    (2006.01)
G06F 13/00   (2006.01)

(52) U.S. Cl. .................... 719/320; 719/313; 709/220
(58) Field of Classification Search ................ 719/319, 719/320; 709/220; 707/1
See application file for complete search history.

(56) References Cited

U.S. PATENT DOCUMENTS

| 7,389,328 B2* | 6/2008 | Yeung et al. ................ 709/218 |
| 2002/0087374 A1* | 7/2002 | Boubez et al. ................ 705/7 |
| 2004/0242329 A1* | 12/2004 | Blackburn et al. ............ 463/42 |
| 2007/0006016 A1* | 1/2007 | Allamaraju ................... 714/4 |

OTHER PUBLICATIONS

Ghandeharizadeh et al, A document as a web service: Two complementary Framework, University of Southern California, 2002, pp. 1-10.*
Pierce et al, Interoperable Web Services for Computational Portals, IEEE, 2002, pp. 1-12.*

(Continued)

*Primary Examiner*—Diem K Cao
(74) *Attorney, Agent, or Firm*—David A. Dagg

(57) ABSTRACT

The present invention relates to network computing and in particular to a method and respective system for operating a Web Services search method in a networked environment—in particular the Internet, wherein a Service Broker is requested by a Service Consumer for offering Web Services, and a Service Provider provides a requested Web Service to the Service Consumer, and wherein a Service Provider registers Web Services at the Service Broker and wherein the Web Services are implemented preferably by respective Remote Portlets running on a Portal Server of the Service Provider. In order to increase the search precision and the recall rate it is proposed to perform the steps of: a) retrieving data mining input data relating to description details of the inquired Web Services from respective Service descriptions of the inquired Web Services, b) performing a data mining function on said data mining input data, wherein a clustering is performed with a distance calculation function including said description details and wherein the clustering yields a cluster model comprising a plurality of clusters and a mapping for each Web Service to one of said clusters, wherein Web Services having a similar semantic meaning are collected in a single cluster, yielding a data mining result, c) adding cluster information comprised of said data mining result to a service model and storing this cluster information in a database, d) offering search response data based on said cluster model and service model.

18 Claims, 7 Drawing Sheets

OTHER PUBLICATIONS

Zhuge et al, Flexible retrieval of Web Services, Elsevier Inc, 2003, pp. 107-116.*
Fan et al, A Snapshot of Public Web Services, SIGMOD Record, vol. 34, No. 1, Mar. 2005, pp. 24-32.*
http://www.research.ibm.com/journal/sj/432/will.html, 2004.
http://www.research.ibm.com/journal/sj/412/gottschalk.pdf, 2002.
http://www.oasis-open.org/cornmittees/download.php/3343/oasis-200304-wsrp-specification-1.0.pdf, 2003.
www.Portals.Apache.org/jetspeed-2/guides/index.html, Aug. 14, 2006.
www.Portals.Apache.org/jetspeed-2/guide-portal-design.html, Aug. 14, 2006.

* cited by examiner

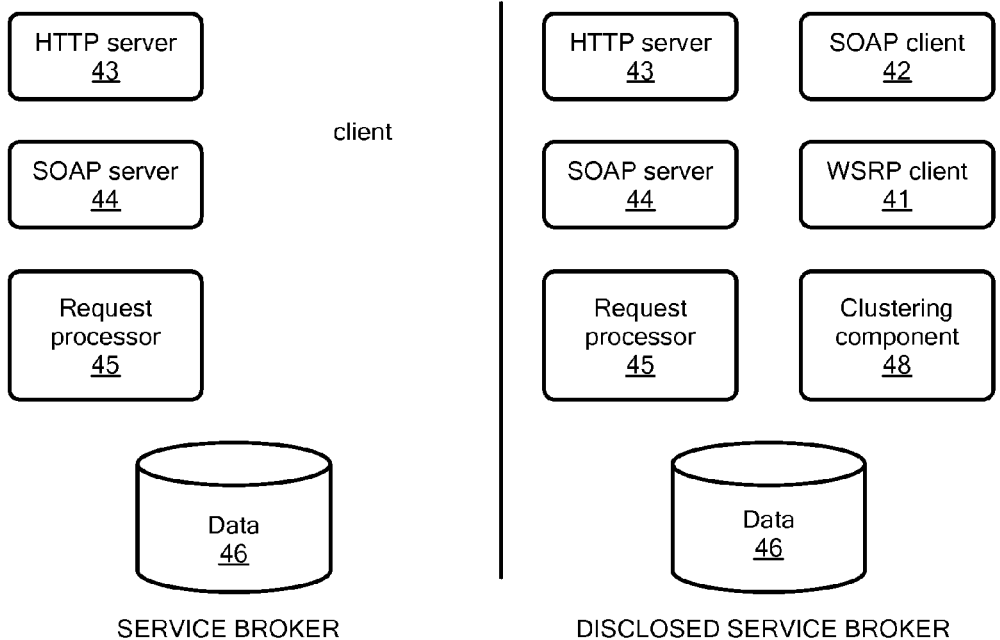
FIG. 5A
PRIOR ART
FIG. 5B
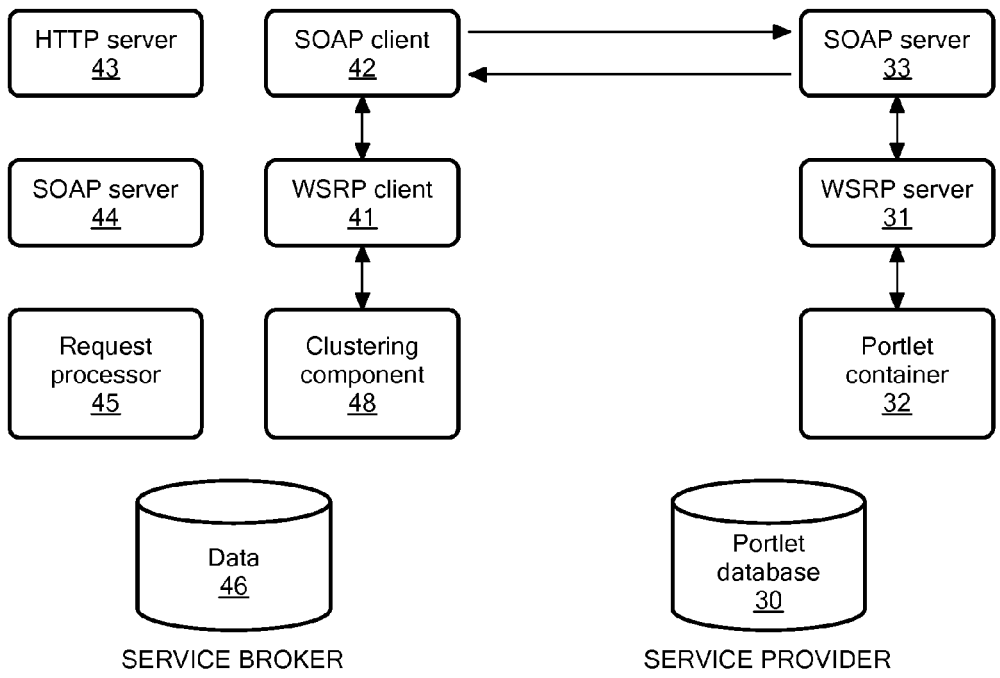
FIG. 6

SERVICE BROKER REALIZING STRUCTURING OF PORTLET SERVICES

CROSS REFERENCE TO RELATED APPLICATIONS

The present application claims priority under 35 USC 119 to European Patent Application Number EP05111944.4, filed Dec. 12, 2005.

FIELD OF THE INVENTION

The present invention relates to network computing and in particular to a method and respective system for operating a Web Services search method in a networked environment—in particular the Internet, wherein a Service Broker is requested by a Service Consumer for offering Web Services, and a Service Provider provides a requested Web Service to the Service Consumer, and wherein the Web Services are preferably implemented by respective Remote Portlets running on a Portal Server of the Service Provider.

BACKGROUND OF THE INVENTION

Prior art web Portals provide end users with unified access to content, applications, and collaboration services in a highly personalized manner. An example is IBM's WebSphere Portal which provides a middleware framework and tools for building and managing portals using component applications called portlets. A Web portal, or simply a portal, is a Web site that offers a broad array of resources and services typically targeted towards specific categories of user populations.

Although portlets can use Web services to implement their function, this requires a significant programming effort. The WSRP standard simplifies integration of remote applications and content into a portal via Web services without programming.

WSRP standardizes Web services at the presentation layer on top of the existing Web services stack, builds on the existing Web services standards, and will benefit from additional future Web services standards efforts as they become available.

At its core, the WSRP standard defines pluggable, user-facing, interactive Web services that implement Web Services Description Language (WSDL) interfaces and a fixed protocol for processing user interactions and providing presentation fragments suitable for mediation and aggregation by portals. WSRP defines the conventions for publishing, finding, and binding such services. WSRP permits any compliant Web service to be plugged into any compliant portal without requiring any service-specific adapters. A single, generic adapter on the portal end is sufficient.

FIG. 1 gives a schematic system view on a Web server implementing such prior art Web Portal.

A prior art Portal as e.g., represented by above IBM WebSphere Portal or by Jetspeed2 Enterprise Portal is built by a complex functionality implemented on a network server—for example a Web server 100, the most important elements of which are logic components for user authentication 105, state handling 110, aggregation 115 of fragments, a plurality of Portlets 120 —further described below-provided in respective pages 125 with a respective plurality of APIs 130 to a respective Portlet container software 135 for setting them into the common Web page context, and some Portal storage resources 140. The logic components are operatively connected such that data can be exchanged between single components as required. This is roughly depicted in FIG. 1.

In more detail, a Portal engine of the Web server in FIG. 1 implements an aggregation of Portlets 120 based on the underlying Portal model 150 and Portal information such as security settings, user roles, customization settings, and device capabilities. Within the rendered page, the Portal automatically generates the appropriate set of navigation elements based on the Portal model. The Portal engine invokes Portlets during the aggregation as required and when required and uses caching to reduce the number of requests made to Portlets. The prior art IBM WebSphere Portal employs open standards such as the Java Portlet API (application programming interface). It also supports the use of a remote Portlet via the WSRP standard.

Remote portlets are portlets, which reside on a different portal server and which are accessed through an appropriate web service protocol. An example is the before-mentioned WSRP 1.0. Due to this fact a remote portlet can be regarded and processed like a traditional web service itself. This is why also remote portlets can be referenced in a prior art service broker which provides business information and technical information about web services to any requesting web service consumer. In this sense, Web Services are implemented by respective Remote Portlets running on a Portal Server of the Service Provider.

As follows from www.uddi.org the so-called Universal Description, Discovery, and Integration (UDDI) protocol is a key member of the group of interrelated standards that comprise the Web services stack. It defines a prior art standard method for publishing and discovering the network-based software components of a service-oriented architecture (SOA). The current version is UDDI V3.02 and describes the Web services, data structures and behaviors of all instances of a UDDI registry.

FIG. 2 shows the general situation relevant for the present invention. A Service oriented architecture (prior art) is given in a networked environment, wherein a Service Broker 230 is requested by a Service Consumer 210 for offering Web Services, and a Service Provider 220 provides a requested Web Service to the Service Consumer. In the real world, of course, each of said objects 210, 220 and 230 are present multiple times.

Such Service-oriented architecture is for example described in IBM Systems Journal, Vol. 41, No. 2, 2002, pp 170 to 177.

FIG. 3 illustrates prior art interactions between Service Broker and Service Requester and Service Provider. More particularly, a prior art UDDI service broker 130 and a sample UDDI client—both, service requester and service provider may act as client—interact according to the following basic scheme:

The UDDI client 210, 220 incorporates a SOAP client and invokes UDDI operations through this SOAP client. The UDDI service broker 230 offers the UDDI web service interface and thus incorporates HTTP server and SOAP server components that receive the UDDI request issued by the UDDI client. The UDDI service broker further incorporates a component to process the UDDI request based on the service data which is stored in a Registry database. The SOAP server invokes this component which processes the request and returns the response to the UDDI client through the HTTP server.

FIG. 4 illustrates the prior art interactions between a service requester and a service provider via WSRP.

The Service Requester comprises a portal which is embedded in an application server. The Portal Server consumes a remote portlet via the standard WSRP protocol. For this purpose the service requester incorporates a WSRP client and a SOAP client component.

The service provider incorporates a SOAP server, a WSRP server and a portlet container. The WSRP server accepts the WSRP request and processes the requests by preparing and invoking an appropriate operation on the local portlet via the Portlet container. The request is processed and the resulting data is returned to the requester.

With reference to FIG. 5A the functional components structure of a prior art Service Broker comprises a HTTP Server 43, a SOAP Server 44, a Request processor 45, and a database 46 to store the Web Services identifications, and other commercial data related thereto. All components are provided with a hardware and/ or software interface as required to any other components.

The Request processor 45 processes the requests against its database 46. Incoming requests are processed and the resulting data is returned to a Service Requester. SOAP Server 44 as well as HTTP Server 43 implements the functionality required by the protocols, when using the Internet and the above-mentioned SOAP protocol.

With further reference to the very focus of the present invention prior art service brokers support search operations for searching web services which are based on keywords or on manual categorization. A prior art service broker, however, does not recognize the semantics or functional similarities or relationships between web services. The discovery of web services based on manually assigned keywords and categories which is supported by UDDI is inefficient, because the services retrieved by an UDDI search are often not corresponding to that what was expected in the search.

So the prior art search for Web Services has generally a low precision, i.e. many services are found which are not wanted by the client, and a low recall rate, i.e. the search misses the services which were really needed to be considered by the client.

SUMMARY OF THE INVENTION

It is thus an objective of the present invention to provide for an improved Web Services search method and system. This objective of the invention is achieved by the features stated in enclosed independent claims. Further advantageous arrangements and embodiments of the invention are set forth in the respective subclaims. Reference should now be made to the appended claims.

In brief, a service broker implementing an embodiment of the disclosed method uses data mining functionality for a mining of portlet mark-up and portlet descriptions of remote portlets in order to create a service model structure of the remote portlet services. This structure reflects the relationships and dependencies between the searched portlets and is made available to the requesting service consumers, which may advantageously use this information for finding primarily those remote portlets which they actually search for. This basic approach exploits the coincidence between Web services and the Portlets behind. Thus, a Web Service can be searched and explored when the underlying Portlet and its content-related data is made available to the search mechanism.

According to the most basic aspect of the present invention the Service Broker associated server-side software and hardware implements a method for operating a Web Services search method in a networked environment, wherein a Service Broker is inquired by a Service Consumer for Web Services, and a Service Provider provides a requested Web Service to the Service Consumer, wherein a Service Provider registers Web Services at the Service Broker, wherein the Service Broker maintains a service model comprising Web Service description data and wherein the service model is created by the Service Broker according to Web Service data offered by the Service Provider and wherein the service model is used by the Service Broker to process inquiries issued by the Service Consumer, wherein the method is characterized by the steps of:

a) retrieving data mining input data relating to description details of the requested Web Services from respective Service descriptions of the requested Services—and present according to a Web Services Protocol used for calling a Web Service e.g. WSRP 2.0;

b) performing a data mining function on the data mining input data, wherein a clustering is performed with a distance calculation function including these description details, and wherein the clustering yields a cluster model comprising a plurality of clusters and a mapping for each Web Service to one of the clusters, wherein Web Services having a similar semantic meaning are collected in a single cluster, which is resulting in a data mining result;

c) adding cluster information according to said data mining result to said service model, resulting in an extended service model, thus associating each service with the cluster it is assigned to in the data mining result and storing this extended service model in a database, d) offering search response data based on said extended service model in response to Web Services search operations.

It should be noted that the cluster model is to be understood as the result of the clustering. It comprises information relating to the number of clusters and the mapping between a service and a cluster.

The service model comprises data about the services. The mapping between a service and a cluster is transferred to and thus reflected in the extended Service model.

Advantageously, the Web Services can be implemented by respective Remote Portlets running on a Portal Server of the Service Provider.

Further implementations of the Web Services are as follows:

Web Services can be implemented in various programming languages on basis of different middleware software products. A Web Service may realize a self description operation, which can be invoked through the Web Service interface by Service Consumers. The self description operation returns a service description. The structure of the service description depends on the Web Service implementation. A Web Service may for example offer a "getDescription" operation which returns service name, explanatory statement about the service, a formal specification of the semantic of each service operation, a list of events the service can consume or publish as well as a set of sample operation results. The Service Broker may use this information as data mining input.

A Service Consumer may create a database containing the description of the services he uses. Again the structure of the description depends on the implementation. The database may contain description details like name, notes created by the service consumer, logs of historic service requests and responses etc. The Service Consumer may transfer this information to the Service Broker who creates a Web Service description from this information and uses this Web Service description as data mining input.

For example, if the search can be associated with a single cluster, then only Web Services collected within this cluster are output or the Web Services collected within this cluster are output primarily, i.e., with the highest priority in the search result.

Thus, according to the invention a web services search method is provided which allows grouping the offered web services according to the semantic relationship between the services. This kind of grouping also allows discovering new services which are related to services which a user is currently already working with. Further, such grouping allows to search for a set of multiply functionally related services, which is very useful for service consumers because they may acquire a more complete services offer including the respective service environment of a given service, i.e. additional services, optional services, nice-to-have services, which otherwise are not seen by the service consumer in a prior art search result. Further, such grouping allows to realize an Explorer—like user interface for browsing through related services in order to support a user in finding the adequate service.

When further the Web Service Consumer request comprises description details of a Web Service pre-known by the search requestor himself, this is a useful additional option for efficiently retrieving Web Services that are related to a service used by the search requester, e.g. complementary Web Services. This option also enables the service broker to find services that are related to a previously unknown service specified by the search requestor in the search request.

When further the distance calculation includes the degree of interaction between Web Services, then a useful means is implemented for discovering functionally related Web Services. This is applicable when a Portlet can process an event issued by another Portlet, e.g., a flight number is generated by one Portlet as an output parameter, and is able to be processed by a second one as an input parameter.

When the disclosed method is performed in order to register a new Web Service offered by a Web Service Provider, and when the data mining result comprises the cluster ID of the cluster assigned to the new Web Service, then an efficient registering of a Web Service yet unregistered at the Service Broker can be obtained.

When the disclosed method further comprises the steps of:
requesting offered Web Services from a Service Provider,
and receiving the offered Services,
and integrating the received Services into the clustering Model,
then a solution is disclosed wherein a Service Broker actively enriches its Services Pool.

When the disclosed method further comprises the step of requesting offered Web Services from a Service Broker, and
the Service Broker performs the prior art query processing,
extending the query result by services that are assigned the same cluster as the found services, then a solution is disclosed wherein a Broker actively performs query extension based on the clustering model in order to improve the recall ration.

At the Service Consumer side the invention enriches prior art by the step sequence of first issuing a Web Service description—when a search for related Web Services is intended—and receiving a list of semantically related Web Services.

BRIEF DESCRIPTION OF THE DRAWINGS

The subject matter regarded as the invention is particularly pointed out and distinctly claimed in the concluding portion of the specification. The invention, both as to organization and method of operation, together with objects, features, and advantages thereof, may best be understood by reference to the following detailed description when read with the accompanying drawings in which:

FIG. 5A is a schematic block diagram representation illustrating the essential structural and functional components implemented in a server of a prior art service broker;

FIG. 5B is a depiction according to prior art FIG. 5A, implementing an embodiment of the disclosed system, illustrating the essential structural and functional components implemented in a server of a service broker according to a preferred embodiment of the present invention, including a clustering component, FIG. 6 is a schematic block diagram representation illustrating the interactions between the disclosed service broker and a service provider via WSRP;

DETAILED DESCRIPTION OF EXEMPLARY EMBODIMENTS

Figure 1:
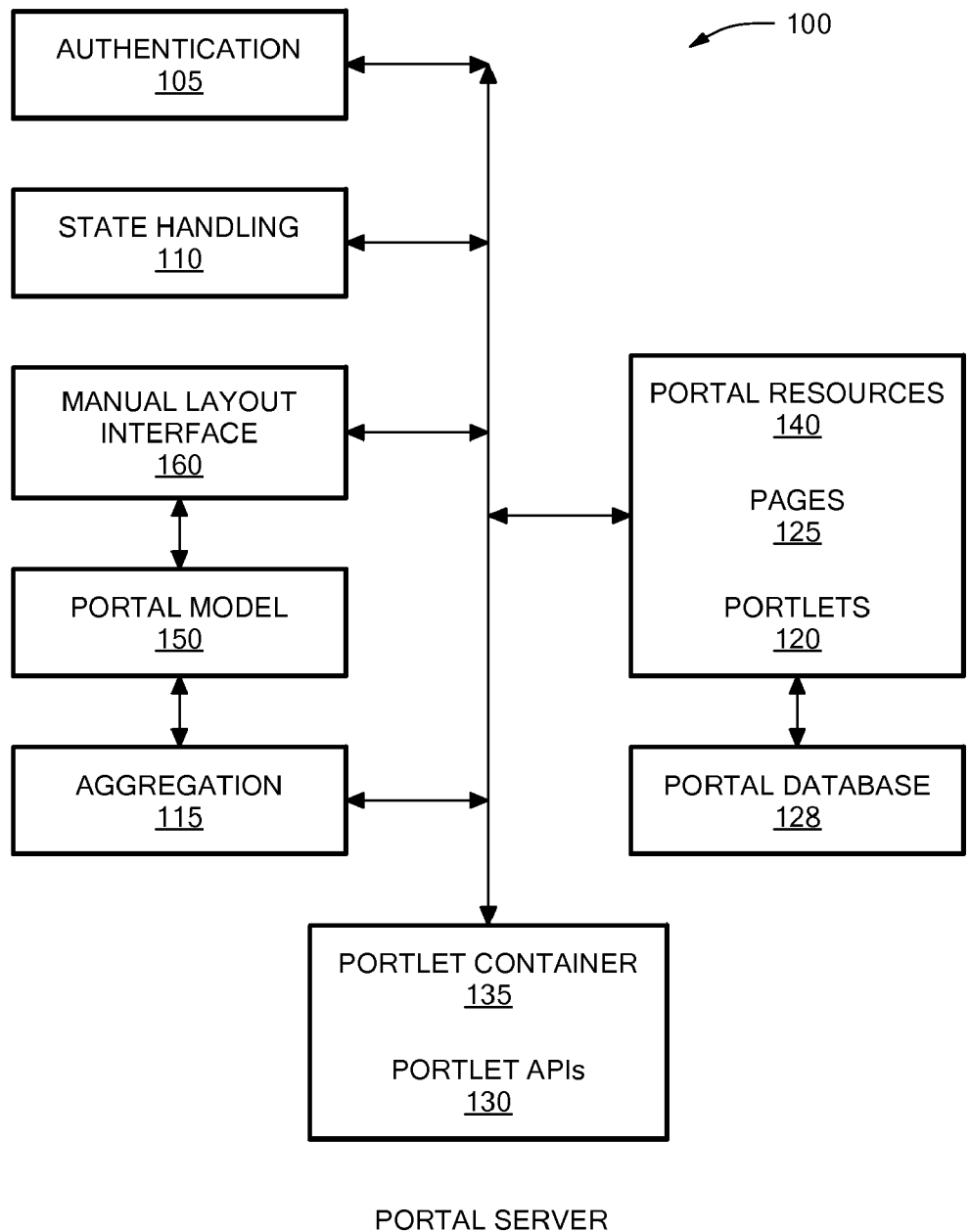
FIG. 1 is a schematic block diagram representation illustrating a schematic system view on a Web server implementing a prior art Web Portal.
Figure 2:
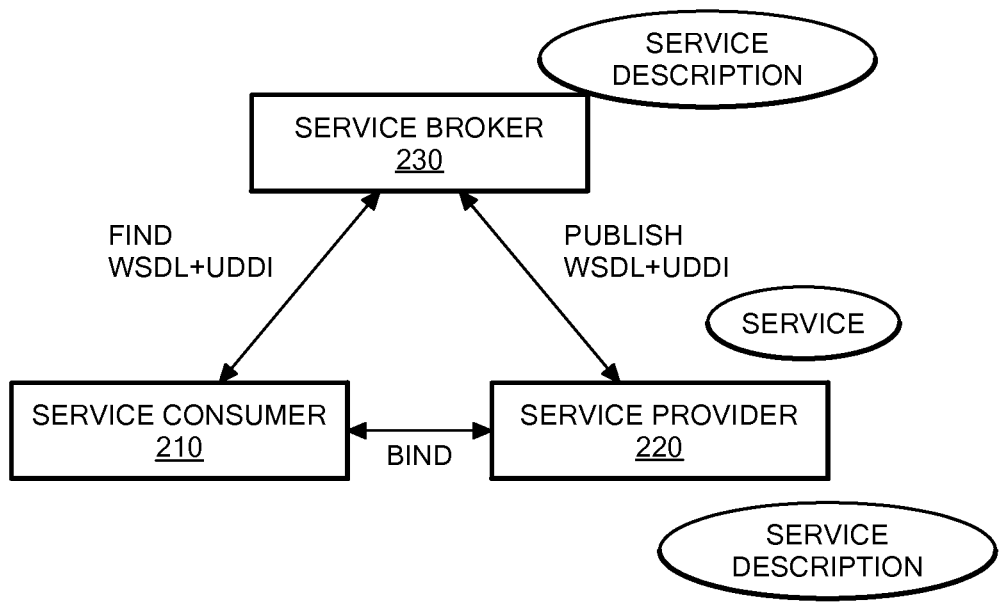
FIG. 2 is a schematic block diagram representation illustrating the basic of a service-oriented architecture according to prior art and including service consumer, service provider and service broker.

With general reference to the figures and with special reference now to FIG. 5B, a WSRP client component 41, a SOAP client component 42 and an additional functional component—a clustering component 48—is provided depicted within the structural architecture of an illustrative embodiment of a Service broker implementation.

In this embodiment a special case is described in which the Web Services are represented by Remote Portlets located on respective Remote Portals. Thus the Data mining input is the Service description in form of the Portlet description and the Portlet markup.

In particular, the disclosed clustering component 48 performs the clustering and retrieves the portlet description and portlet markup from the WSRP client, which requests this information via the SOAP client from the service provider. A clustering or data mining result will be obtained from the step of clustering. The component 48 implements a subcomponent, which calculates a new, extended service model from this clustering result. This model data is stored in the database 46. Details to the model are given further below.

FIG. 6 illustrates the interactions between the disclosed service broker (SB) and a service provider (SP), which are required for retrieving the input data for the data mining procedure from the plurality of service providers. A single service provider serves here as an exemplary input data source. The service provider's WSRP server 31 accepts WSRP requests issued by the Service Broker and transforms these requests into requests to his local portlet container 32. The results of these requests are sent back via a WSRP response to the service Broker using the SOAP server 33.

Next, the interface between a Service requester and the disclosed service broker will be described:

In a preferred embodiment, the cluster ID is mapped to a UDDI tModel. tModels are prior art metadata constructs in UDDI data structure that provide the ability to describe compliance with a specification (e.g. a protocol), a concept or a shared understanding. They have various uses in a UDDI service broker. Commonly agreed specifications or taxonomies can be registered with UDDI as tModels. They can also be used to associate entities with individual nodes in taxonomies. When a tModel is registered with a UDDI registry, it is assigned a unique key, which can be used by entities to refer to it. To categorize entities in UDDI, tModels are used in relation with so called CategoryBags and tModelBags, which are data structures that allow entities to be categorized according to one or more tModels.

In a preferred embodiment, the clustering component 48 registers each cluster ID as tModel. The clustering component also adapts the service data to contain a tModel reference according to the cluster the service is associated with. Thus the clustering component creates a bijective mapping between cluster ID and tModel. This allows to transport categorization information, i.e. cluster information, through prior art UDDI protocols.

The advantage results, that the prior art interface between service requester and service broker—for example the UDDI API "find_service"—is not modified. This API finds UDDI businessService elements and accepts as search parameters "tModelBag". The operation finds services which are associated with one of the supplied tModels. Because a prior art tModel may represent a cluster ID, this operation may be used by a service requester to retrieve services of a given category.

In a further embodiment of the present invention, the prior art "find_service" API is extended to take as additional parameters the "portlet_description" attributes and a representation of the "portlet_markup" and returns the list of services within the same category, that is the list of services that are associated with the same cluster as the supplied portlet description and portlet markup.

Figure 10:
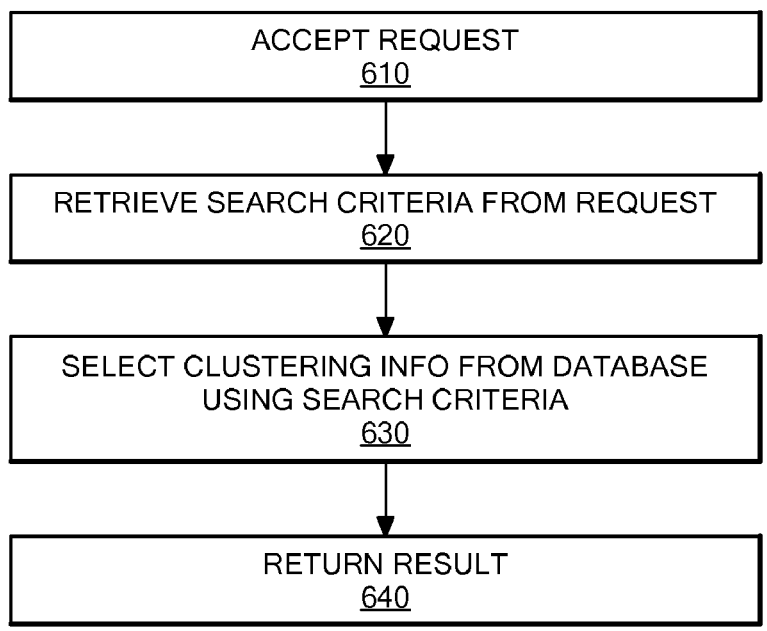
FIG. 10 is a schematic representation of the control flow of the disclosed method according to a specific embodiment thereof illustrating the request for a clustering model issued by a Service Consumer and being processed by a Service Broker.

Next, and with reference to FIGS. 8, 9 and 10 a preferred embodiment of the disclosed method will be described in more detail next below.

The clustering component performs clustering in parallel to activities in other service broker components. Clustering may be performed for example in parallel to request processing.

The clustering component realizes heuristics to determine when clustering will be performed and implements an interface through which a program may request clustering. For example, a simple heuristic is to perform clustering when a service provider sends a request to register a new service. An alternative heuristic is to perform clustering each night or after a pre-defined time interval. Through the interface, an administrator may request clustering using an administration program.

Figure 8:
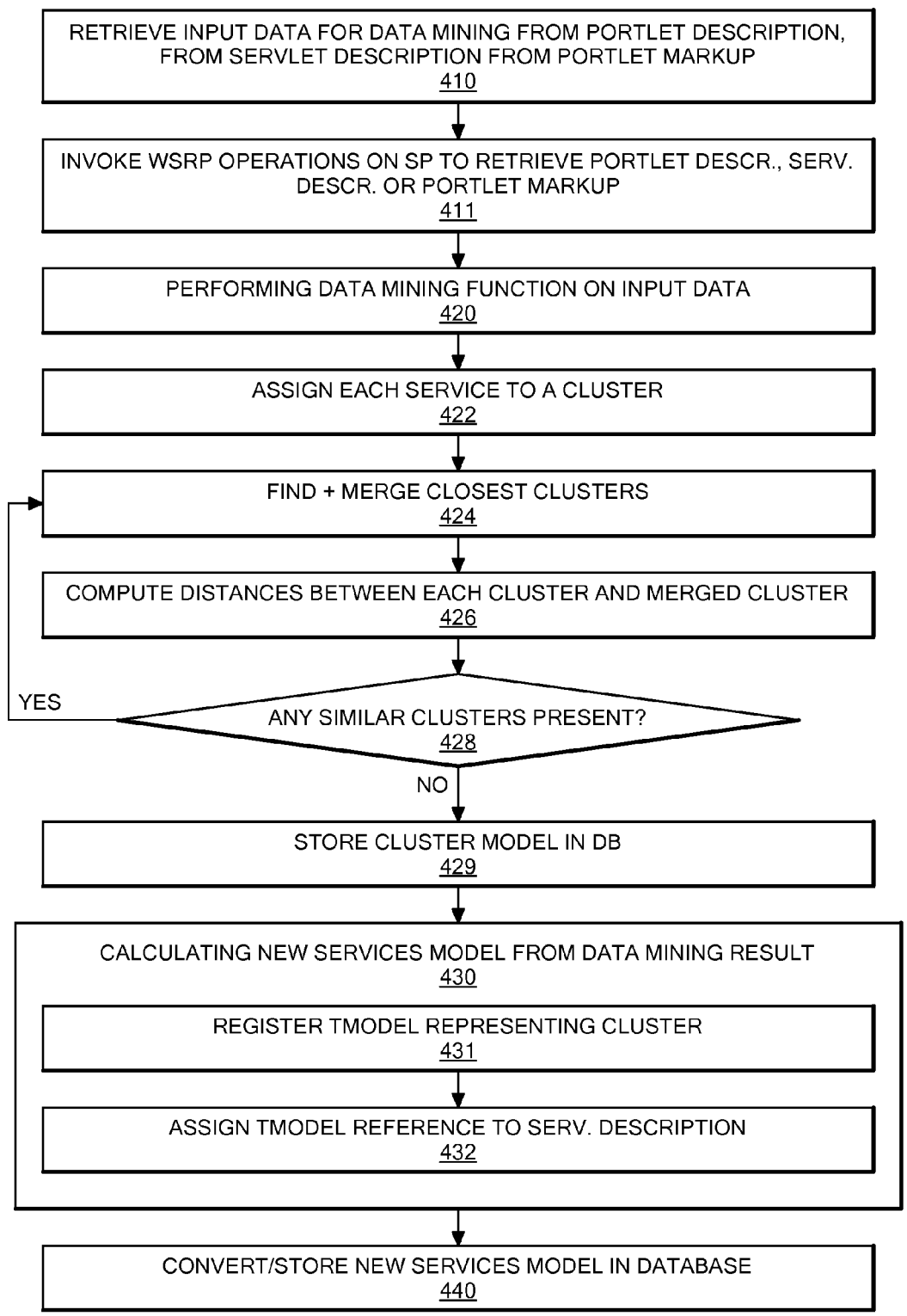
FIG. 8 is a schematic representation of the control flow of the disclosed method according to a specific embodiment thereof when performed at the Service Broker, and illustrating the details of a computation of a cluster model and an adaptation of the service model according to this cluster model including the processing of portlet markup, portlet description.
Figure 9:
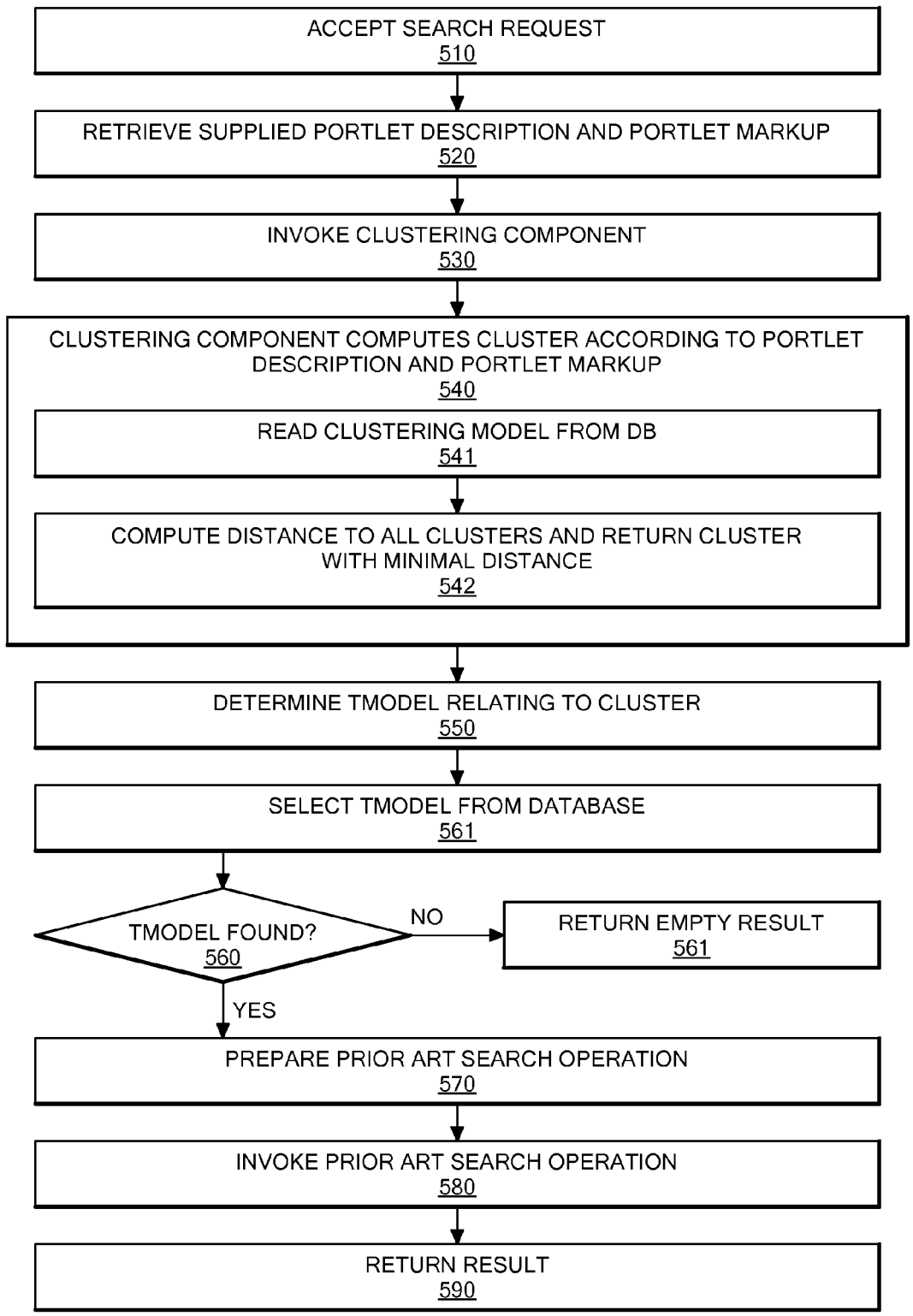
FIG. 9 is a schematic representation of the control flow of the disclosed method according to a specific embodiment thereof when performed at the Service Broker when processing a search request comprising service description details.

The clustering control flow is depicted in FIG. 8, resulting in cluster structures developing during performing the clustering of services within the mining function performed in the disclosed method within component 48. It should be added that the clustering of services is mainly done by clustering the remote portlets implementing the services.

In a first preparative block of steps which are depicted as block 410 in FIG. 8 the data mining input data is retrieved. Possible data sources are a respective portlet description, a portlet interaction interface description, and portlet markup. This information is usually present at the service provider which stores this information in the portal database 30. The service broker requests this data from the service provider through the operations of the WSRP protocol, see step 411. Further, input data can also be requested from portlets themselves.

This embodiment uses the following input parameters:

From the portlet description (in form of WSRP PortletDescription data structure) the attributes: portlet name, portlet description, portlet title, portlet short title, keywords are used;

From the WSRP ServiceDescripton data structure further descriptive information about the services can be used which is present in form of the EventDescription data type and declares the events the service may generate or handle.

The portlet markup, for example from HTML fragments, as returned by the getMarkup operation of the WSRP protocol. The portlet markup accords to HTML or another markup language like XHTML, XML etc.

In the end of step 410 all relevant input data for the subsequent data mining step 420 is present.

In block 420 the data mining is done based on above-mentioned input data collected in step 410. For this block 420, basic prior art data mining technology can be applied. This data mining function includes a prior art clustering algorithm which is applied to the present data, and which returns a hierarchy of clusters of related portlets and thus related services.

Briefly, the clustering returns a set of clusters, i.e. the set of all clusters is a function of all services. As a person skilled in the art knows, clustering is the process of grouping a set of objects into classes of similar objects. Central to clustering is to determine the degree of similarity (or dissimilarity) between individual objects and between clusters, which is expressed as a distance value.

The preferred algorithm of the invention uses agglomerative hierarchical clustering techniques which iteratively join together similar clusters. This is depicted in steps 422 to 428 in FIG. 8. Details thereof are described next below:

Step 422: The algorithm starts by assigning each service to a cluster, so that if there is a number of N (N can be 5000, for example) services, initially there are N clusters, each containing just one service. For each pair of clusters, the distance between the cluster pair is the same as the distance between the services they contain.

Step 424: here, the closest (most similar) pair of clusters is determined. Then, they are merged into a single cluster, so that now there remains a reduced number (N-1) of clusters.

Step 426: Then the distances between the new cluster and each of the old clusters is computed. This can be achieved for example as follows:

The distance $d(A, B)$ between two services A, B is based on the distance between the service attributes, i.e., the portlet descriptions and portlet markups of the portlets A and B. Prior art text processing and text mining methods are used to compute the distance between attribute pairs (for example TF-IDF Weighting and Cosine Similarity Measure, see for example Ricardo A. Baeza-Yates, Berthier Ribeiro-Neto, Modern Information Retrieval, Addison-Wesley Longman Publishing Co., Inc., Boston, Mass., 1999.

On basis of service distance, an inter-cluster distance is defined. The distance D(X, Y) between two clusters X, Y is computed by aggregating the distance values of pairs of services in X and Y, for example in a complete linkage method (here aggregation is performed by calculating the maximum of all distances between pairs of services in two clusters):

D(X, Y)=max {d(A, B) where service A is in cluster X and service B is in cluster Y}.

If a cluster contains more than one Service, then a respective number of calculations is done.

Then a loop condition 428:

"Do the distance values exceed a pre-defined distance threshold?" is executed and steps 424 and 426 are repeated until the distance values exceed this pre-defined distance threshold, i.e. the loop is continued and the clusters get merged in order to contain more and more Services as group members until there are no more similar clusters—according to the pre-defined maximum distance—which could be merged in a further iteration of step 424.

The end result of the mining function is thus a reduced number of clusters, wherein each Cluster comprises a certain plurality of inter-related Services.

In step 429 the cluster model is stored in the service broker database 46. This step comprises converting the internal cluster model representation to a format suited to be stored in the database (for example relational tables).

Figure 7:
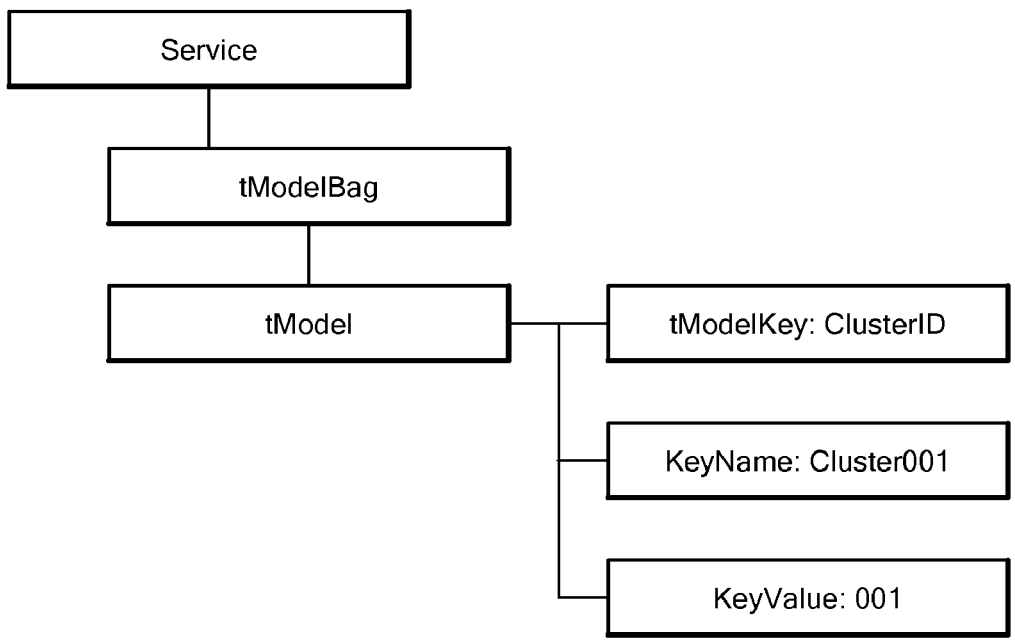
FIG. 7 is a conceptual depiction of a tModel representing cluster information and the relationships between this tModel and other data elements from the service model.

Then, a service model is calculated in step 430 from the mining result. The service model is advantageously implemented as an extension of a prior art service model, for example by mapping the clusterID to a UDDI tModel, as exemplarily given in FIG. 7. In addition, the mapping between tModel and cluster ID is stored in the service broker database 46, for example in a relational table.

In order to do that in step 431 it is checked if a tModel representing the cluster already exists by querying the database. If this representation does not exist, a new representation is created. This comprises creating and registering a unique tModel and storing the relation between this tModel and the cluster ID in the service broker database 46. Creating and registering a tModel is based on prior art service broker functionality.

Further, in this respect, in step 432 the tModel representing the cluster the service is assigned to the service data.

The model acts as a basis for response data sent to the requesting Service Consumer. It can be implemented in table form, or in a tree-like form, for example in form of an XML fragment, or in form of a serialized programming language object, whatever representation is more preferred by the service consumer.

The result of block 430 including the steps 431 and 432 is a services structure model that reflects the associations between a service and the cluster it is assigned to in step 420.

In step 440 the service model is stored in the service broker database 46. Thus the service model resulting from step 430 is made available to the other service broker components, for example the request processor. Step 440 may convert the internal service model representation (for example the object oriented representation) into a representation which is suited to be stored in the database (for example the relational tables).

Figure 3:
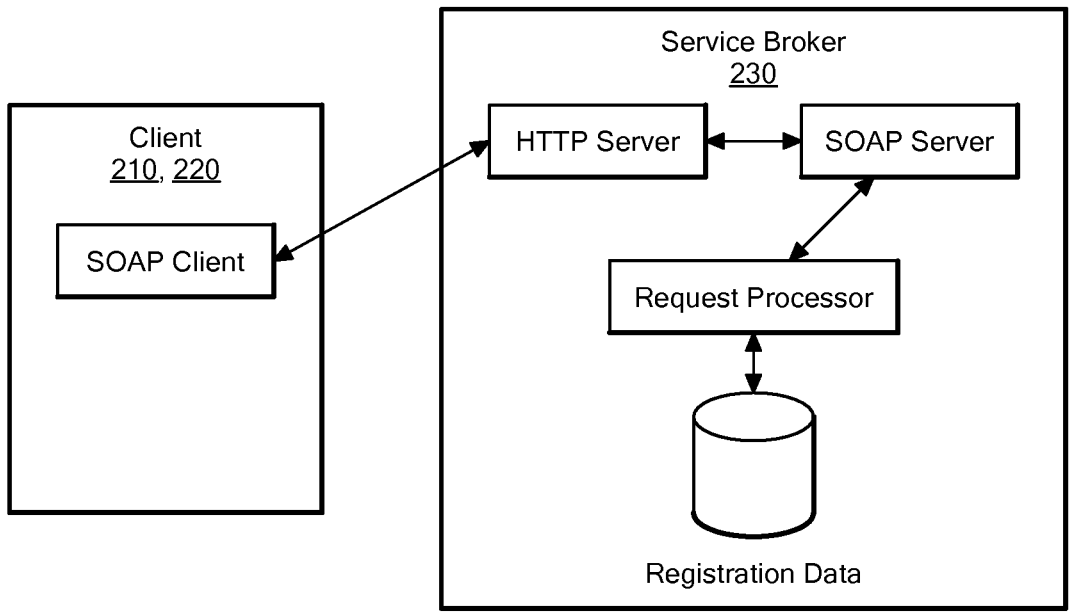
FIG. 3 is a schematic block diagram representation illustrating prior art interactions between service broker, service requester and service provider.
Figure 4:
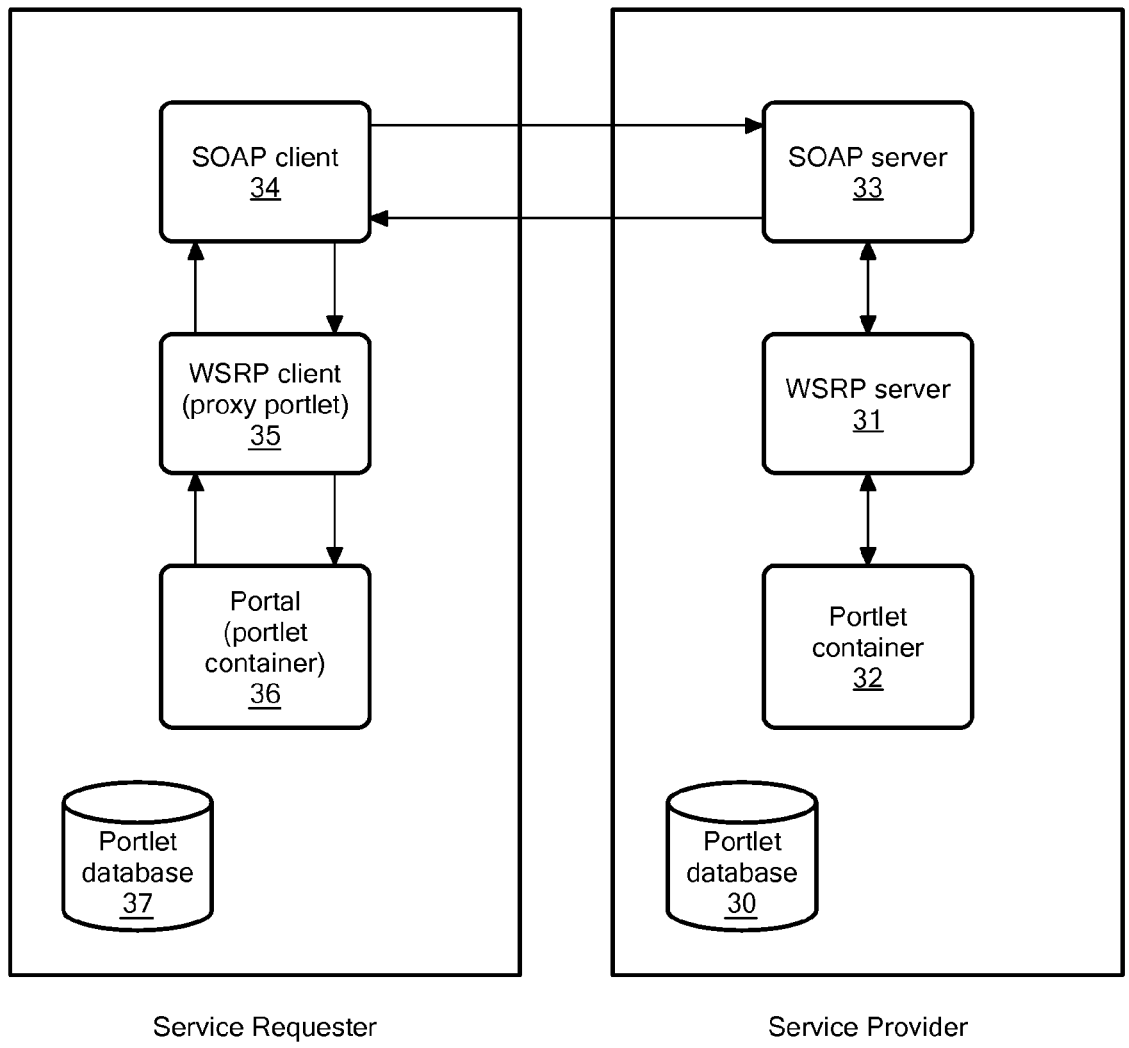
FIG. 4 is a schematic block diagram representation illustrating prior art interactions between a service requester and a service provider via WSRP.

The new service model is used for request processing. The new service model incorporates the clustering result represented in prior art data formats. Thus it can be processed by the prior art request processing component, see FIG. 3. For example if a client intends to retrieve services assigned to a given cluster, he invokes prior art operation to retrieve the according tModel and issues a further search request that includes the mentioned tModel. The request processor will return those services that comprise the given tModel, i.e. are assigned to the corresponding cluster.

A service consumer may request inquiry about the cluster model, i.e. the number of clusters and the set of tModels that represent clusters. The service broker's request processor comprises the control flow exemplarily shown in FIG. 10 to process cluster model inquiry requests. In more detail, in step 610 the request is accepted and in step 620 the search criteria relating to the cluster model is retrieved from the request. For example, a search criterion may be a representation of the condition "select largest cluster". In step 630 the search criteria is mapped to a database search condition and the database is queried. In step 640 the result is returned.

According to a further feature of the disclosed system as mentioned above the request processor component 45 of the Service Broker is extended to accept and process search requests containing portlet description and portlet markup in order to find semantically related services. The search request contains a representation of the portlet details and the portlet markup, for example in XML format or in the form of serialized programming language objects.

The request processor then performs the control flow exemplarily shown in FIG. 9 as follows:

In step 510 the request is accepted. In step 520 the portlet description and the portlet markup are retrieved from the request.

In step 530 the request processor invokes the clustering component 48 in application mode and passes the portlet description and the portlet markup. In application mode the clustering component 48 determines the cluster for a given portlet while the clustering model is not modified. This is performed in block 540:

In step 541 of block 540 the cluster model is read from the database; in step 542 the distance between the passed portlet and the clusters contained in the cluster model is calculated. This is performed by creating a cluster Z consisting of the passed portlet only and computing the distance between this cluster and every cluster in the cluster model according to the above-mentioned distance calculation algorithm D(X, Z). The closest cluster (most similar to Z) is determined, and if the distance is below the pre-defined distance threshold this cluster and cluster Z are joined.

In step 550 the tModel relating to this cluster is determined. This is performed by querying the database 46 for the tModel relating to the cluster. If no tModel is found, i.e. if the portlet is not assigned to an existing cluster, the request processor returns an empty result in step 561.

Otherwise, the request processor prepares a prior art search operation in step 570 for services containing the resulting tModel. In step 580 this operation is invoked and in step 590 the result returned by this operation is passed back.

In order to illustrate further the use of the invention, a Service Consumer may realize the following control flow to retrieve a set of related portlets:

The Service Consumer issues a prior art search request. The response contains a set of services including the assigned tModels. The Service Consumer checks the set of tModels, selects those tModels that represent a cluster and issues a prior art search request containing the selected tModels. The response comprises those services that are associated with the supplied tModels, i.e. are assigned to one of the set of clusters that correspond to the supplied set of tModels.

The Service Consumer may further realize the following control flow to retrieve portlets that are related to one or multiple portlets deployed to the Service Consumer Portal:

The Service Consumer issues a search request by including portlet description and portlet markup taken from one or multiple local Service Consumer portlets. The Service Broker is able to retrieve the requested portlets by performing the control flow depicted in FIG. 9. This is true even if the portlets whose markup and description are included in the request are not known to the service broker. The disclosed method thus enables the service broker to find services that are related to a service which itself is not registered at the service broker. This represents a significant advantage in contrast to prior art.

The present invention can be realized in hardware, software, or a combination of hardware and software. A Web Services search tool according to the present invention can be realized in a centralized fashion in one computer system, or in a distributed fashion where different elements are spread across several interconnected computer systems.

The figures include block diagram and flowchart illustrations of methods, apparatus(s) and computer program products according to an embodiment of the invention. It will be understood that each block in such figures, and combinations of these blocks, can be implemented by computer program instructions. These computer program instructions may be loaded onto a computer or other programmable data processing apparatus to produce a machine, such that the instructions which execute on the computer or other programmable data processing apparatus create means for implementing the functions specified in the block or blocks. These computer program instructions may also be stored in a computer-readable medium or memory that can direct a computer or other programmable data processing apparatus to function in a particular manner, such that the instructions stored in the computer-readable medium or memory produce an article of manufacture including instruction means which implement the function specified in the block or blocks. The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions specified in the block or blocks.

Those skilled in the art should readily appreciate that programs defining the functions of the present invention can be delivered to a computer in many forms; including, but not limited to: (a) information permanently stored on non-writable storage media (e.g. read only memory devices within a computer such as ROM or CD-ROM disks readable by a computer I/O attachment); (b) information alterably stored on writable storage media (e.g. floppy disks and hard drives); or (c) information conveyed to a computer through communication media for example using wireless, baseband signaling or broadband signaling techniques, including carrier wave signaling techniques, such as over computer or telephone networks via a modem.

While the invention is described through the above exemplary embodiments, it will be understood by those of ordinary skill in the art that modification to and variation of the illustrated embodiments may be made without departing from the inventive concepts herein disclosed.

We claim:

1. A method for operating a Web Services search method in a networked environment, wherein a Service Provider registers Web Services at a Service Broker, and wherein a Service Broker is inquired by a Service Consumer for offering Web Services, and a Service Provider provides an inquired Web Service to the Service Consumer, wherein the Service Broker maintains a service model comprising Web Service description data and wherein the service model is created by the Service Broker according to Web Service data offered by the Service Provider, and wherein the service model is used by the Service Broker to process inquiries issued by the Service Consumer, comprising:

retrieving data mining input data relating to description details of the inquired Web Services from respective Service descriptions of the inquired Web Services;

performing a data mining function on said data mining input data, wherein a clustering is performed with a distance calculation function including said description details, wherein the distance calculation includes the degree of interaction between said Web Services, and wherein the clustering yields a cluster model comprising a plurality of clusters and a mapping for each Web Service to one of said clusters, wherein Web Services having a similar semantic meaning are collected in a single cluster, yielding a data mining result;

adding cluster information according to said data mining result to said service model resulting in an extended service model, thus associating each service with the cluster it is assigned to in the data mining result and storing this extended service model in a database; and offering search response data based on said extended service model in response to Web Services search operations.

2. The method of claim 1, wherein said Web Services are implemented as Remote Portlets, and wherein said data mining input data is obtained from respective Portlet markup.

3. The method of claim 1, wherein said Web Services are implemented as Remote Portlets, and wherein said data mining input data is obtained from the Portlet description.

4. The method of claim 1, wherein said Web Services are implemented as Remote Portlets, and wherein said data mining input data is obtained from the Service Description.

5. The method of claim 1, wherein the Web Service Consumer inquiry is a request and comprises a Web Service Description of a service preknown by the Web Service Consumer and previously unknown to the Service Broker.

6. The method of claim 5, further comprising:

receiving, by the Web Service Consumer, a list of Web Services related to the service preknown by the Web Service Consumer and previously unknown to the Service Broker.

7. The method of claim 1, performed in order to register a new Web Service offered by a Web Service Provider, wherein the data mining result comprises the cluster ID of the cluster assigned to the new Web Service.

8. The method of claim 1, wherein the degree of interaction between said Web Services comprises whether one of said Web Services can process an event issued by another of said Web Services.

9. A system, including at least one processor and at least one computer readable memory, the computer readable memory having program code stored thereon for operating a Web Services search method in a networked environment, wherein a Service Broker is inquired by a Service Consumer for offering Web Services, and a Service Provider provides an inquired Web Service to the Service Consumer, said program code comprising:

an input interface for retrieving data mining input data relating to description details of the inquired Web Services from respective Service descriptions of the inquired Web Services;

a clustering component for performing a data mining function on said data mining input data, wherein a clustering is performed with a distance calculation function including said description details, wherein the distance calculation includes the degree of interaction between said Web Services, and wherein the clustering yields a cluster model comprising a plurality of clusters and a mapping for each Web Service to one of said clusters, wherein Web Services having a similar semantic meaning are collected in a single cluster, yielding a data mining result, and for adding cluster information according to said data mining result to a service model resulting in an extended service model, thus associating each service with the cluster it is assigned to in the data mining result and storing this extended service model in a database; and program code for offering search response data based on said extended service model in response to Web Services search operations.

10. A system including at least one processor and at least one computer readable memory, said computer readable memory having program code stored thereon for operating a Web Services search method in a networked environment, wherein said program code for operating said Web services search method is operable when a Service Broker is inquired by a Service Consumer for offering Web Services, and a Service Provider provides an inquired Web Service to the Service Consumer, said program code comprising:

program code for retrieving data mining input data relating to description details of the inquired Web Services from respective Service descriptions of the inquired Web Services;

program code for performing a data mining function on said data mining input data, wherein a clustering is performed with a distance calculation function including said description details, wherein the distance calculation includes the degree of interaction between said Web Services, and wherein the clustering yields a cluster model comprising a plurality of clusters and a mapping for each Web Service to one of said clusters, wherein Web Services having a similar semantic meaning are collected in a single cluster, yielding a data mining result;

wherein said program code for performing said data mining function adds cluster information comprised of said data mining result to a service model and for storing this cluster information in a database; and program code for offering search response data based on said cluster model in response to Web Services search operations.

11. The system of claim 10, wherein said Web Services are implemented as Remote Portlets, and wherein said data mining input data is obtained from respective Portlet markup.

12. The system of claim 10, wherein said Web Services are implemented as Remote Portlets, and wherein said data mining input data is obtained from the Portlet description.

13. The system of claim 10, wherein said Web Services are implemented as Remote Portlets, and wherein said data mining input data is obtained from the Service Description.

14. The system of claim 10, wherein the Web Service Consumer inquiry is a request and comprises a Web Service Description of a service preknown by the Web Service Consumer and previously unknown to the Service Broker.

15. The system of claim 14, further comprising:

program code for receiving, by the Web Service Consumer, a list of Web Services related to the service preknown by the Web Service Consumer and previously unknown to the Service Broker.

16. The system of claim 10, performed in order to register a new Web Service offered by a Web Service Provider, wherein the data mining result comprises the cluster ID of the cluster assigned to the new Web Service.

17. The system of claim 10, wherein the degree of interaction between said Web Services comprises whether one of said Web Services can process an event issued by another of said Web Services.

18. A computer program product including a physical computer readable storage medium, said physical computer readable storage medium having program code stored thereon for operating a Web Services search method in a networked environment, wherein said program code for operating said Web services search method is operable when a Service Broker is inquired by a Service Consumer for offering Web Services, and a Service Provider provides an inquired Web Service to the Service Consumer, said program code comprising:

program code for retrieving data mining input data relating to description details of the inquired Web Services from respective Service descriptions of the inquired Web Services;

program code for performing a data mining function on said data mining input data, wherein a clustering is performed with a distance calculation function including said description details, wherein the distance calculation includes the degree of interaction between said Web Services, and wherein the clustering yields a cluster model comprising a plurality of clusters and a mapping for each Web Service to one of said clusters, wherein Web Services having a similar semantic meaning are collected in a single cluster, yielding a data mining result;

wherein said program code for performing said data mining function adds cluster information comprised of said data mining result to a service model and for storing this cluster information in a database; and program code for offering search response data based on said cluster model in response to Web Services search operations.

* * * * *